(12) United States Patent
Polcuch

(10) Patent No.: US 10,538,310 B2
(45) Date of Patent: Jan. 21, 2020

(54) NEAR SYNCHRONOUS DISTRIBUTED HYDRAULIC MOTOR DRIVEN ACTUATION SYSTEM

(71) Applicant: Parker-Hannifin Corporation, Cleveland, OH (US)

(72) Inventor: Eric Alexander Polcuch, Mission Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 276 days.

(21) Appl. No.: 15/613,618

(22) Filed: Jun. 5, 2017

(65) Prior Publication Data

US 2018/0002028 A1 Jan. 4, 2018

Related U.S. Application Data

(60) Provisional application No. 62/356,037, filed on Jun. 29, 2016.

(51) Int. Cl.
| | | |
|---|---|---|
| *B64C 9/16* | (2006.01) | |
| *B64C 9/22* | (2006.01) | |
| *B64C 13/50* | (2006.01) | |
| *B64C 9/32* | (2006.01) | |
| *B64C 13/36* | (2006.01) | |

(52) U.S. Cl.
CPC .................. *B64C 9/16* (2013.01); *B64C 9/22* (2013.01); *B64C 9/323* (2013.01); *B64C 13/36* (2013.01); *B64C 13/504* (2018.01); *B64C 13/505* (2018.01)

(58) Field of Classification Search
CPC .. B64C 9/16; B64C 9/22; B64C 9/323; B64C 13/504; B64C 13/505; B64C 13/36
See application file for complete search history.

(56) References Cited

U.S. PATENT DOCUMENTS

| | | | |
|---|---|---|---|
| 4,649,484 A | 3/1987 | Herzog et al. | |
| 4,762,294 A * | 8/1988 | Carl | G05D 1/0077 244/99.9 |
| 5,033,694 A * | 7/1991 | Sato | B63B 39/06 244/78.1 |
| 7,556,224 B2 * | 7/2009 | Johnson | B64C 13/50 244/175 |
| 8,172,174 B2 | 5/2012 | Hejda | |
| 9,190,942 B2 | 11/2015 | Polcuch | |

(Continued)

*Primary Examiner* — Rodney A Bonnette
(74) *Attorney, Agent, or Firm* — Renner, Otto, Boisselle & Sklar, LLP

(57) ABSTRACT

A control system may be used to control actuators that actuate movement of flight control surfaces of an aircraft. Each actuator is couplable to a flight control surface and includes a motion control assembly having a hydraulic motor and a drive path from the hydraulic motor to the flight control surface. Each hydraulic motor includes an extend port and a retract port. The system includes a hydraulic control module fluidly connected to the extend port and the retract port of each hydraulic motor and a controller operable to output hydraulic power from the hydraulic control module to the motion control assembly to actuate movement of the flight control surfaces. The controller is configured to identify an actuator that positionally leads the other actuators and reduce hydraulic power to the motion control assembly assigned to such actuator.

18 Claims, 17 Drawing Sheets

(56) References Cited

U.S. PATENT DOCUMENTS

| | | | |
|---|---|---|---|
| 2004/0245386 A1* | 12/2004 | Huynh | B64C 9/16 |
| | | | 244/99.5 |
| 2005/0029407 A1* | 2/2005 | Pohl | B64C 9/16 |
| | | | 244/221 |
| 2010/0282899 A1 | 11/2010 | Heintjes | |
| 2011/0062282 A1 | 3/2011 | Richter et al. | |
| 2012/0018578 A1* | 1/2012 | Polcuch | H02P 8/40 |
| | | | 244/99.2 |

* cited by examiner

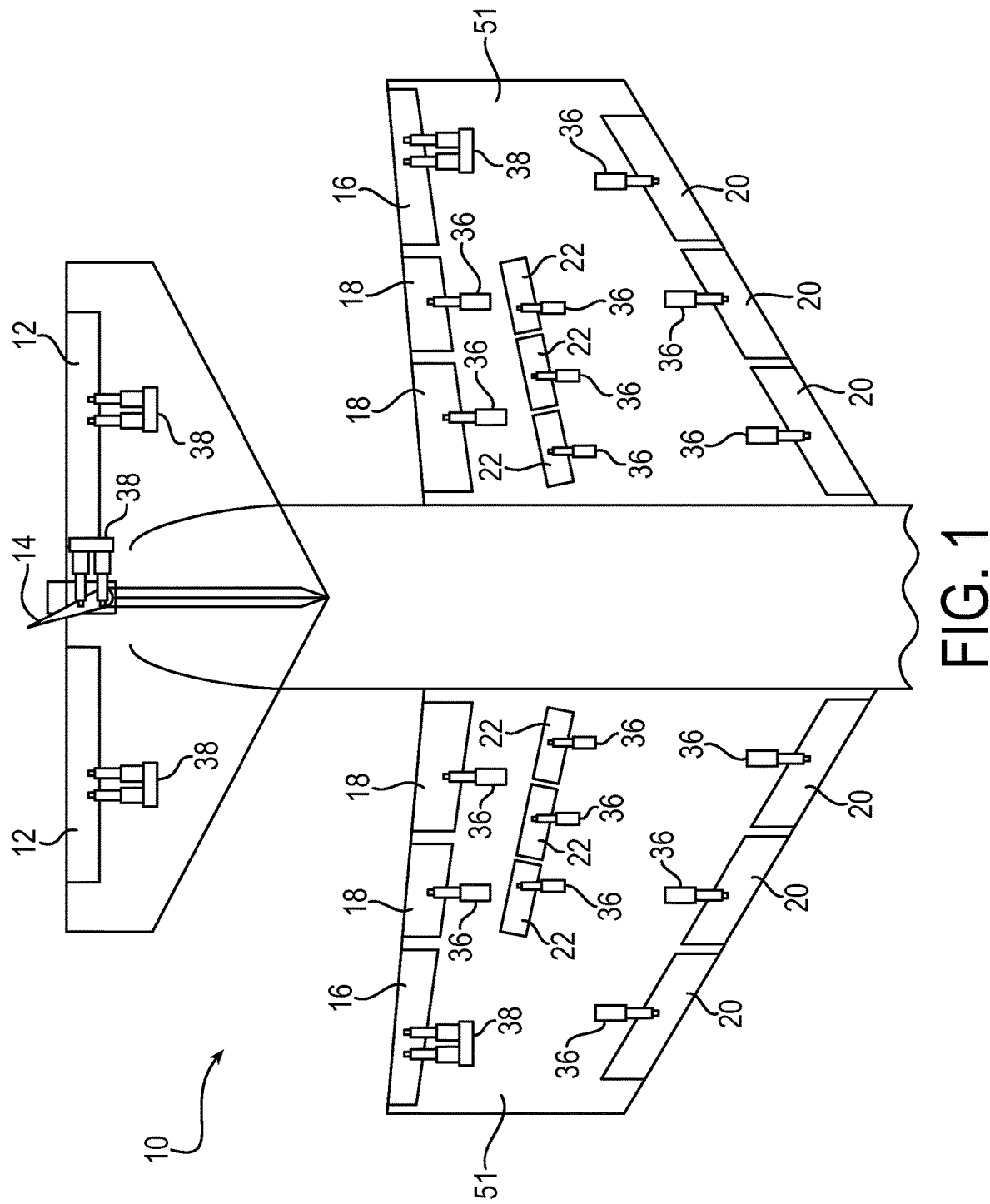

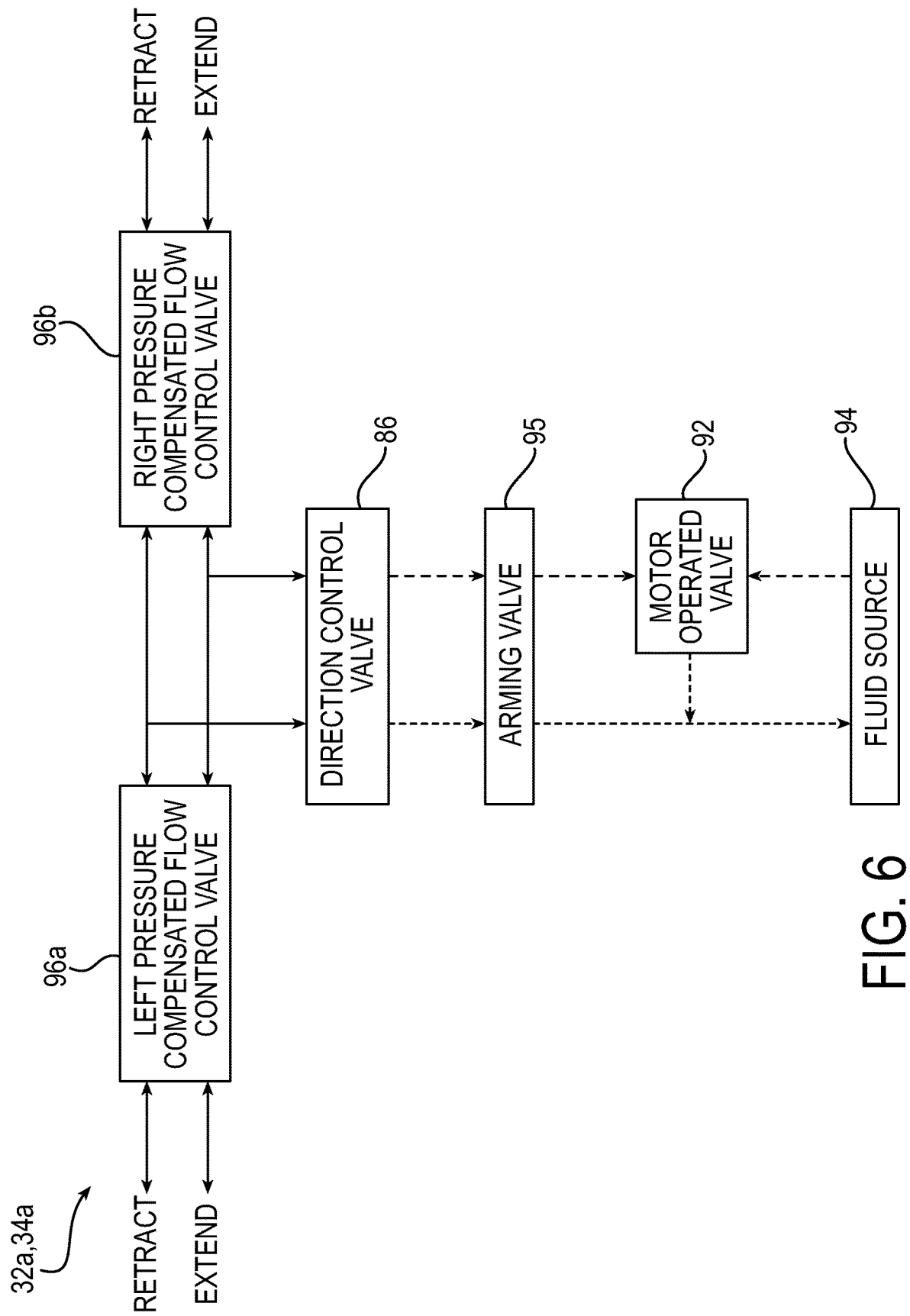

NEAR SYNCHRONOUS DISTRIBUTED HYDRAULIC MOTOR DRIVEN ACTUATION SYSTEM

This application claims priority of U.S. Provisional Patent Application No. 62/356,037 filed Jun. 29, 2016, which is hereby incorporated herein by reference.

FIELD OF INVENTION

The present invention relates to a hydro-mechanical actuation drive system requiring the synchronous (or near synchronous) operation of multiple individual actuators.

BACKGROUND

Modern thin wing aircraft designs are aimed at optimizing fuel economy. Due to the thin wing design, the area along the spars of the wings may be congested such that routing of mechanical drive shafts, such as torque tubes, between the central power drive unit and actuators and between actuators may be difficult.

Prior actuation systems may eliminate torque tube routes by providing individual servo-controlled electric actuators at each actuation station such that each station may use one or more motor controllers with associated motor commutation signals and loop closures. Using a multiple controller system may have complex wiring for the controllers and require more components than in other actuation systems. Thus, the prior actuation system may have disadvantages with regards to system reliability, the overall weight of the system aboard the aircraft, the envelope of the aircraft, and the ability to perform maintenance on the system.

SUMMARY OF INVENTION

The present invention is directed towards a hydraulic motor driven actuation system that enables torque tube routes to be eliminated from the actuation system. The present invention provides hydraulic power systems and low powered electronics for position sensing, outer loop solenoid control, or electro-hydraulic servo valve control. The hydraulic motor driven actuation system may be advantageous in that the system may use a common hydraulic power source that drives multiple actuators and provides for synchronous or near-synchronous motion of the actuators. The actuation system has the ability to fit into thin wings and has a reduced component count, such that the system is cost-efficient to manufacture and contributes less weight to the aircraft.

According to an aspect of the invention, a control system for controlling a plurality of actuators may include a plurality of actuators for actuating movement of one or more adjustable components of an aircraft, and each actuator may have a first end couplable to a structure of the aircraft and a second end couplable to one of the one or more adjustable components. Each actuator may include a motion control assembly having a hydraulic motor and a drive path from the hydraulic motor to the one or more adjustable components. Each hydraulic motor may have an extend port and a retract port and the one or more adjustable components may be configured to move along a respective drive path. The control system may include a hydraulic control module fluidly connected to the extend port and the retract port of each hydraulic motor and a controller operable to output hydraulic power from the hydraulic control module to each motion control assembly to actuate movement of the one or more adjustable components.

According to another aspect of the invention, a method for controlling a plurality of actuators for actuating movement of one or more adjustable components of an aircraft may be implemented in the aircraft that includes a plurality of actuators for actuating movement of one or more adjustable components. Each actuator may have a first end couplable to a structure of the aircraft and a second end couplable to one of the one or more adjustable components and each actuator additionally may include a motion control assembly having a hydraulic motor and a drive path from the hydraulic motor to the one or more adjustable components. The one or more components may be configured to move along a respective drive path. The method may include supplying hydraulic drive power from a hydraulic power module through a hydraulic circuit to the motion control assembly for each actuator to actuate movement of the one or more adjustable components, identifying an actuator of the plurality of actuators that positionally leads other actuators of the plurality of actuators, and reducing hydraulic power to the motion control assembly assigned to the actuator that positionally leads the other actuators.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

FIG. 1 is a schematic drawing showing an exemplary aircraft in accordance with aspects of the present invention.

FIG. 6 is a schematic drawing showing a portion of a hydraulic control module for controlling a single actuator.

DETAILED DESCRIPTION

Figure 2A:
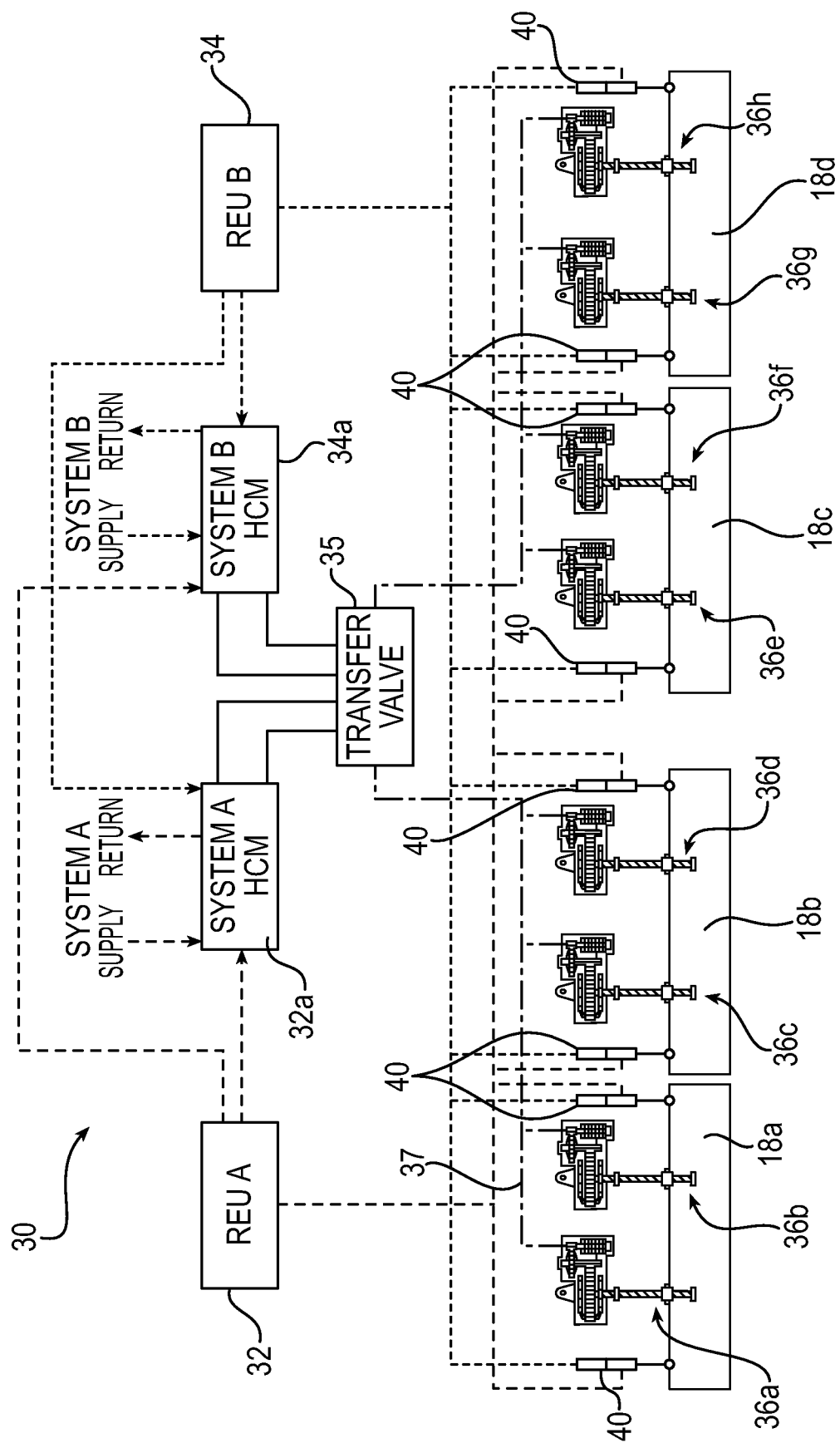
FIG. 2A is a schematic drawing showing a first exemplary embodiment of an actuation system for flight control surfaces of the aircraft of FIG. 1.

Aspects of the present invention relate to a distributed hydro-mechanical actuation system that includes multiple hydro-mechanical actuators intended to operate together in a synchronous (or near synchronous) manner. Each individual actuator may be powered by one or more hydraulic motors that are configured to have a high volumetric efficiency with a low velocity loss relative to the flow of hydraulic fluid. The group of actuators may be controlled from a single hydraulic control module that includes a pressure compensated flow control valve and a directional control valve or an electro-hydraulic servo valve type of open loop control in which the hydraulic flow rate is controlled to assure that the motors operate at a predetermined speed. The output of the actuators is maintained near synchronous over the applied load range within a volumetric efficiency (e.g. internal leakage) between motors over the operating range between a no-load and an operating point maximum load. The group of actuators may be re-synchronized every retract cycle by driving into calibrated retract stops at a controlled speed and torque capability.

The hydro-mechanical actuation system as described herein replaces a traditional actuator and torque tube type of actuation system that is typical on most modern aircraft high lift systems. Using the hydro-mechanical actuation system may eliminate a configuration in which torque tubes and drive members are fed along the wing spar.

Referring now to FIG. 1, a schematic diagram of a portion of an exemplary aircraft and an exemplary flight control surface actuation system is shown. In the illustrated embodiment, the aircraft 10 may include a pair of elevators 12, a rudder 14, and a pair of ailerons 16, which are the primary flight control surfaces, and a plurality of flaps 18, slats 20, and spoilers 22, which are the secondary flight control surfaces. The primary flight control surfaces 12-16 may control aircraft movements about the aircraft pitch, yaw, and roll axes. Specifically, elevators 12 may be used to control aircraft movement about the pitch axis, the rudder 14 may be used to control aircraft movement about the yaw axis, and the ailerons 16 may be used to control aircraft movement about the roll axis. The aircraft movement about the yaw axis may also be achieved either by banking the aircraft or by varying the thrust levels from the engines on opposing sides of the aircraft 10.

The secondary control surfaces 18-22 may influence the lift and drag of the aircraft 10. For example, during aircraft take-off and landing operations, when increased lift is desirable, the flaps 18 and slats 20 may be moved from retracted positions to extended positions. In the extended position, the flaps 18 increase both lift and drag, and enable the aircraft 10 to descend more steeply for a given airspeed, and also enable the aircraft 10 to get airborne over a shorter distance. The slats 20, in the extended position, may increase lift and allow for higher angles of attack without aerodynamic stall of the wing, and are typically used in conjunction with the flaps 18. The spoilers 22, on the other hand, may reduce lift and when moved from retracted positions to extended positions, which is typically done during aircraft landing operations, and may be used as air brakes to assist in slowing the aircraft 10.

Figure 2B:
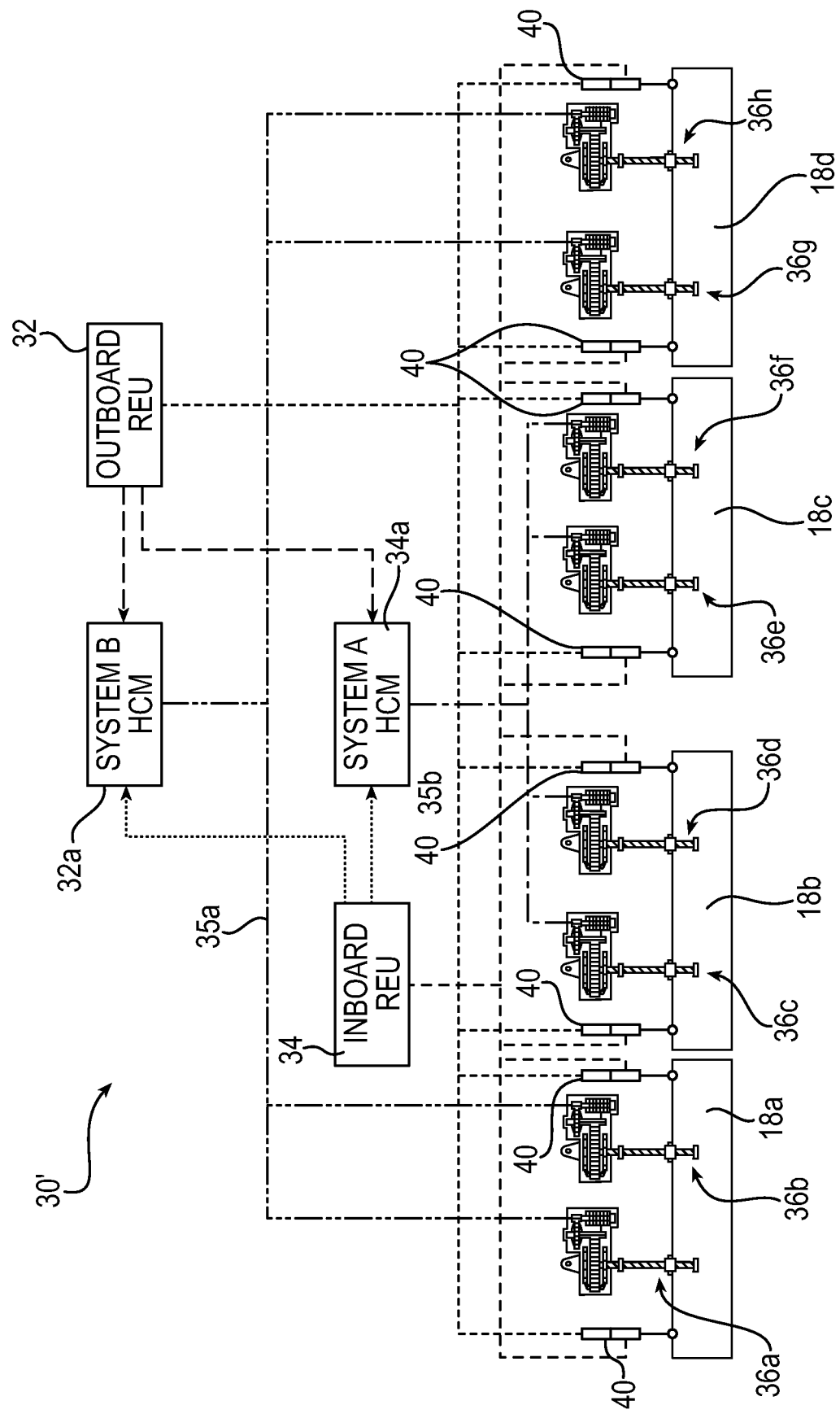
FIG. 2B is a schematic drawing showing a second exemplary embodiment of an actuation system for flight control surfaces of the aircraft of FIG. 1.

Referring in addition to FIGS. 2A and 2B, the flight control surfaces 18a, 18b, 18c, 18d may be moved between the retracted and extended positions via a flight control surface actuation system 30. The flight control surface actuation system 30 is exemplary in nature and not intended to limit the scope of the present invention. The flight control surface actuation system 30 includes one or more actuator controllers 32, 34, such as remote electronic units (REUs) and a plurality of secondary flight control surface hydro-mechanical actuator assemblies 36a, 36b, 36c, 36d, 36e, 36f, 36g, 36h. Each actuator controller 32, 34 is configured to control operation of a plurality of flight control surfaces via a corresponding hydraulic control module 32a, 34a, a transfer valve 35, and one or more connected hydraulic lines 37 that are in communication with hydraulic motors of each of the hydro-mechanical actuator assemblies 36a, 36b, 36c, 36d, 36e, 36f, 36g, 36h. Furthermore, it will be appreciated that the number of actuator controllers 32, 34 may vary. For simplicity purposes, the flight control surface actuation system 30 shown in FIG. 2A includes a dual channel system that is operable to control more than one hydro-mechanical actuator in synchronous and/or near synchronous manner through the hydraulic lines 37 and the transfer valve 35. As used herein, the term "synchronous" and "near synchronous" mean that some difference in actuator position may occur while providing common controlled power to multiple actuators at the same time, but the performance effect on the aircraft is insignificant.

The actuation system 30 and hydraulic control modules 32a, 34a may be implemented according to any one of numerous operational configurations. For example, the system 30 could be configured such that one of the hydraulic control modules 32a, 34a is active and the other control module 32a, 34a is inactive (or standby) mode, which may be used for redundancy purposes. Alternatively, the system 30 may be configured such that both hydraulic control modules 32a, 34a are active and controlling all, or selected ones, of the flight control surface actuator assembly 36 (or as shown in FIGS. 2A and 2B, the actuator assemblies 36a, 36b, 36c, 36d, 36e, 36f, 36g, 36h) to which they are coupled through the hydraulic lines 35. Furthermore, while FIG. 2A illustrates a system with redundant motors and controllers other systems and variations may be used as would be appreciated by one have ordinary skill in the art. For example, a simplex system of a single controller driving a single motor on each of a plurality of actuators, as well as other combinations of simplex and redundant system may be used in accordance with aspects of the present invention. No matter the specific configuration, each controller 32, 34 when active, receives flight control surface position commands from one or more non-illustrated external systems, such as a flight control computer or pilot controls, for example. In response to the flight control surface position commands, the active controllers and corresponding hydraulic control modules may supply hydraulic fluid to drive the hydraulic motors via hydraulic lines 37 that causes the flight control surface actuator assemblies 36a, 36b, 36c, 36d, 36e, 36f, 36g, 36h to move the appropriate flight control surfaces 18-22 (FIG. 1) to the commanded flight control surface position in a synchronous and/or near synchronous manner. The controller and the corresponding hydraulic control module may also be configured to control the fluid supply to the hydraulic motors to stop the actuators at the desired position synchronously or near synchronously.

The controllers 32, 34 may also receive monitor signals that are representative of flight control surface actuator assembly 36, 38 operability. The controllers 32, 34, based on these monitor signals, determine the operability of the flight control surface actuator assembly 36. If one or both controllers 32, 34 determine that a secondary flight control surface actuator assembly 36 is partially inoperable, it may automatically compensate, if necessary, the remaining active actuator(s) electric motor drive power to compensate for that actuator assembly 36 for the partial inoperability. It will be appreciated that the monitor signals that the controllers 32, 34 receive may be supplied directly from the flight control surface actuator assemblies 36, or from other systems and components such as, for example, position sensors 40 (e.g., a linear variable differential transformer or other sensor), which are coupled to the aircraft 10 and the flight control surface to determine a position of the flight control surface. This position information is used by the controller to determine when to drive the actuators to stop, for example.

As further illustrated in FIG. 2A, the hydraulic control modules 32a, 34a may be coupled to a left outboard flap 18a, a left inboard flap 18b, a right inboard flap 18c, and a right outboard flap 18d through hydraulic lines 37, such that in the event that one of the hydraulic control modules 32a, 34a fails or one of the controls 32, 34 fails, the actuation system 30 may still be operable. For example, the hydraulic control module 32a may be a primary controller and the hydraulic control module 34a may be a redundant controller, for example. The hydraulic control modules 32a, 34b, when active, may supply hydraulic fluid to the hydraulic motor that cause the secondary flight control surface actuator assemblies 36 to move the appropriate flight control surface (e.g., flaps 18a-d) to the commanded flight control surface in a synchronous and/or near synchronous manner. Thus, the present system provides control of more than one control surface using a dual channel configuration that may accommodate for the failure of a controller, a hydraulic control module, or a sensor.

As illustrated in FIG. 2B, in another exemplary embodiment of the actuation system 30', the system may be configured as a simple dual channel split system. The controller 32 and hydraulic control module 32a may be coupled to the outboard flaps 18a, 18d through hydraulic lines 35a and the controller 34 may be coupled to the inboard flaps 18b, 18c through hydraulic lines 35b. One of the controllers 32, 34 may be a primary controller and the other controller may be a redundant controller, for example. The controllers 32, 34 and hydraulic control modules 32a, 34a may supply hydraulic fluid to the hydraulic motors that cause the secondary flight control surface actuator assemblies 36 to move the appropriate flight control surface to the commanded flight control surface in a synchronous and/or near synchronous manner. For example, the controller 32 may control operation of outboard flaps 18a, 18d and the controller 34 may control operation of inboard flaps 18b, 18c. Thus, the present system provides control of more than one control surface with a single controller through the hydraulic lines. In contrast to the actuation system shown in FIG. 2A, the actuation system 30' shown in FIG. 2B may be operable without using a transfer valve.

The flight control surface actuation system 30 (or 30') may also be implemented using various numbers and types of flight control surface actuator assemblies 36, 38. In addition, the number and type of flight control surface actuator assemblies 36, 38 per control surface 12-22 may be varied. In the depicted embodiment, the system 30 is configured such that a pair of redundant actuator assemblies 36 are coupled to each of the secondary flight control surfaces 18-22, and a single, redundant actuator assembly 38 is coupled to each of the primary flight control surfaces 12-16. It is noted that the embodiments depicted are merely exemplary, and that the flight control surface actuation system 30 (or 30') could be implemented in any one of numerous alternative configurations. For example, the system 30 could be configured such that two or more non-redundant actuator assemblies 36 are coupled to each, or selected ones, of the secondary flight control surfaces 18-22 (FIG. 1). The system 30 could also be configured such that one or more redundant actuator assemblies are coupled to one or more of the secondary flight control surfaces 18-22, in addition to, or instead of, the single non-redundant actuator assemblies.

Figure 3A:
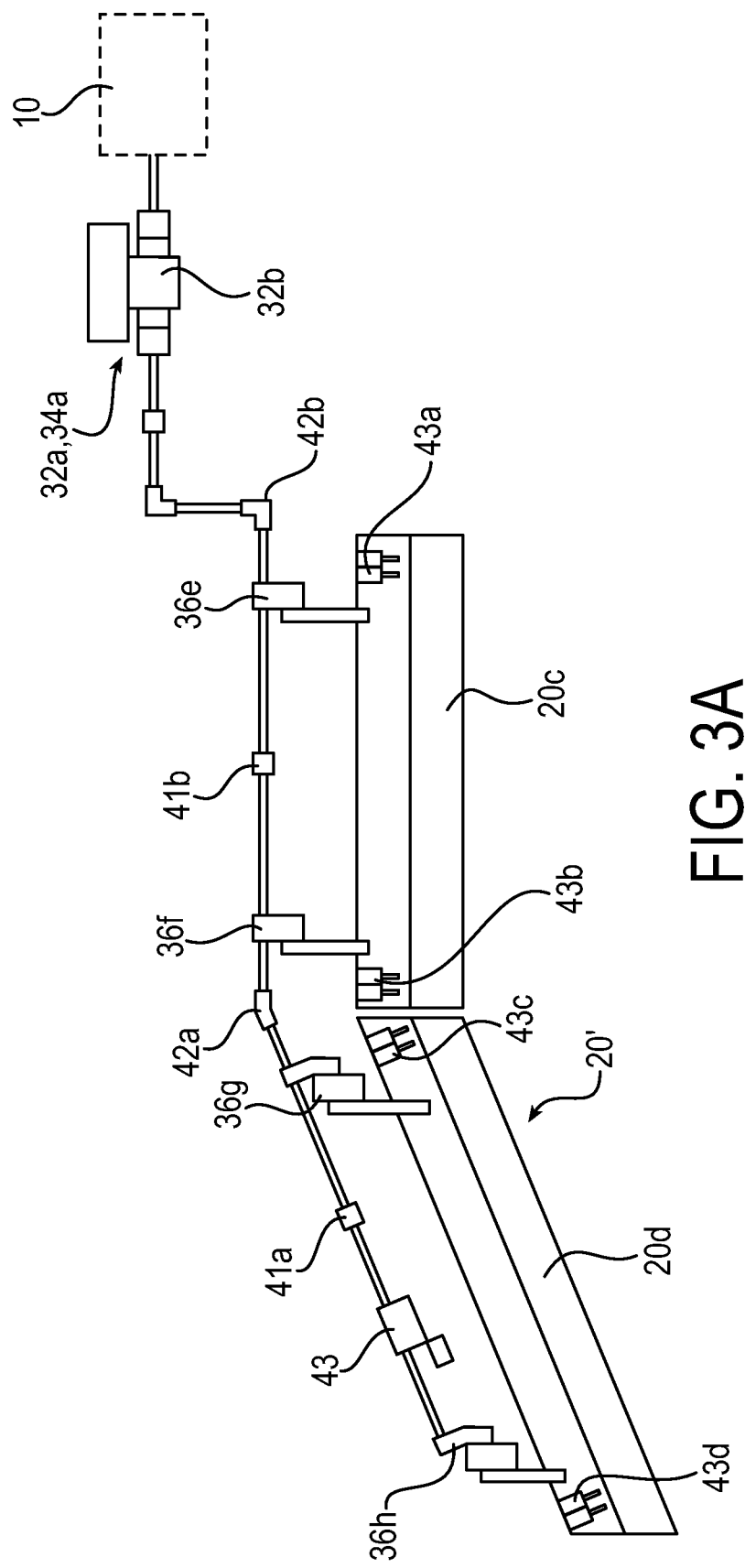
FIG. 3A is a schematic drawing showing the actuation system for actuation of hydro-mechanical actuators associated with a trailing edge flap of the aircraft of FIG. 1.

FIG. 3A shows a traditional trailing edge flap system 20' that may implement the actuation system according to the present invention. FIG. 3A shows a hydraulic control module 32a, 34a for actuation of the hydro-mechanical actuator associated with a slat 20 that is a trailing edge flap. The trailing edge flap may include an outboard slat 20d and an inboard slat 20c. The flap system 20' may include a plurality of actuators 36g, 36h coupled to the outboard slat 20d and a plurality of actuators 36e, 36f coupled to the inboard slat 20c. The actuators may be rotary actuators. The actuators 36e, 36f, 36g, 36h may each include an offset gearbox. The trailing edge slat 20 may further include support bearings 41a, 41b and gearboxes 42a, 42b. A wing tip brake 43 may also be provided along the outboard slat 20d. The outboard slat 20d and the inboard slat 20c may also each include disconnect sensors 43a, 43b, 43c, 43d for disconnecting the control surfaces in the event of a failure. The hydraulic control module 32a, 34a may include a hydraulic power drive unit 32b connected to each of the inboard slat 20c and the outboard slat 20d. The hydraulic power drive unit 32b may be secured to the aircraft 10.

Figure 3B:
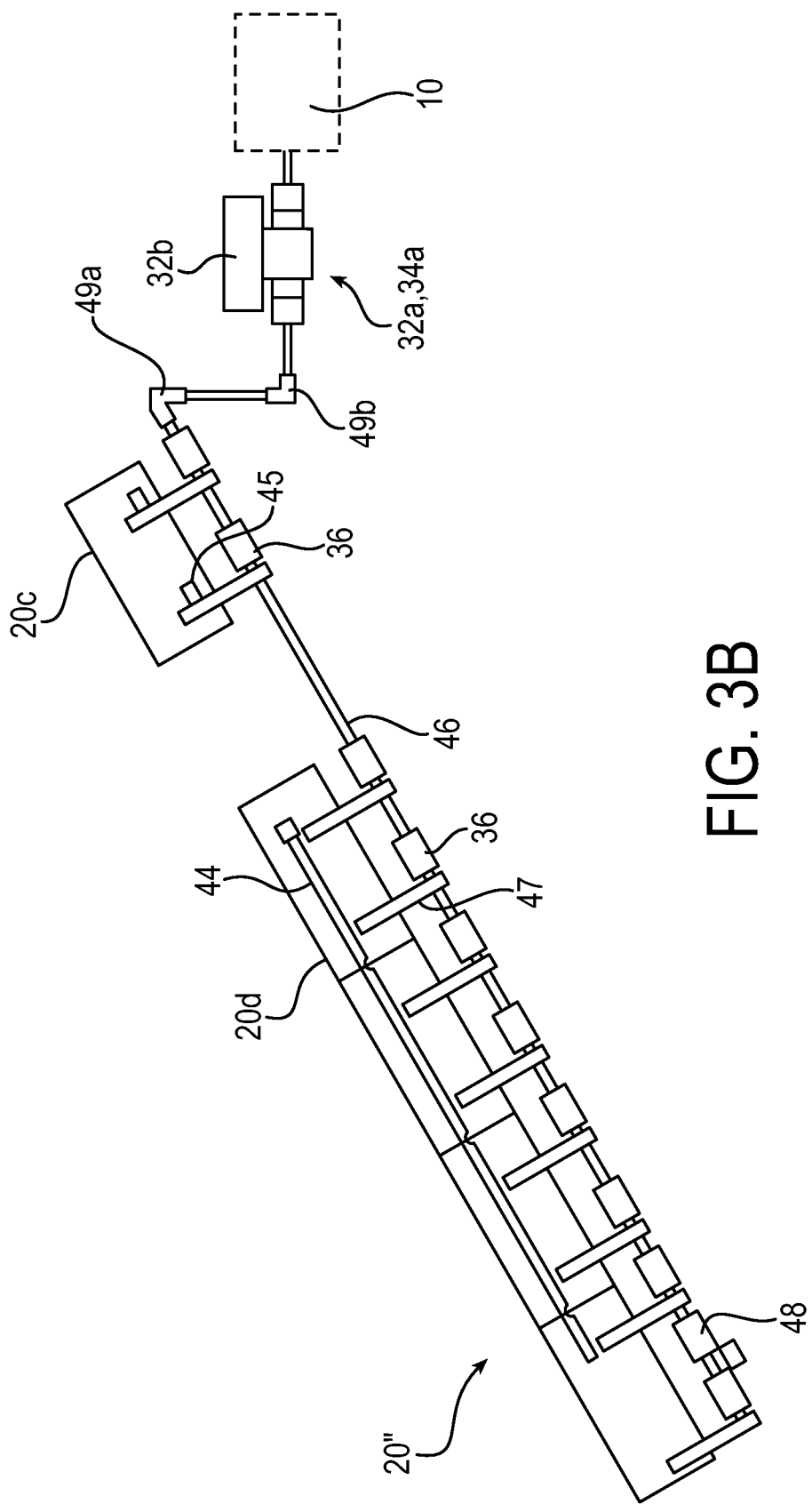
FIG. 3B is a schematic drawing showing the actuation system for actuation of hydro-mechanical actuators associated with a leading edge flap of the aircraft of FIG. 1.

FIG. 3B shows a traditional leading edge flap system 20" that may implement the actuation system according to the present invention. FIG. 3B shows a hydraulic control module 32a, 34a for actuation of the hydro-mechanical actuator associated with a slat 20 that is a leading edge flap. The flap system 20" may include an outboard skew system 44 for detecting skew in an outboard slat 20d and inboard skew sensors 45 for detecting skew in an inboard slat 20c. The flap system 20" may include a plurality of actuators 36 and a torque shaft 46 coupled between the inboard slat 20c and the outboard slat 20d. The actuators 36 may be rotary actuators. Each actuator 36 may include a torque activated or load activated overload brake 47. A driveline brake 48 may also be coupled to the outboard slat 58. The flap system 20" may include gearboxes 49a, 49b that are connected between the hydraulic power module 32a, 34a and the inboard slat 20c. The hydraulic power module 32a, 34a may include a hydraulic power drive unit 32b that is secured to the aircraft 10.

Figure 4A:
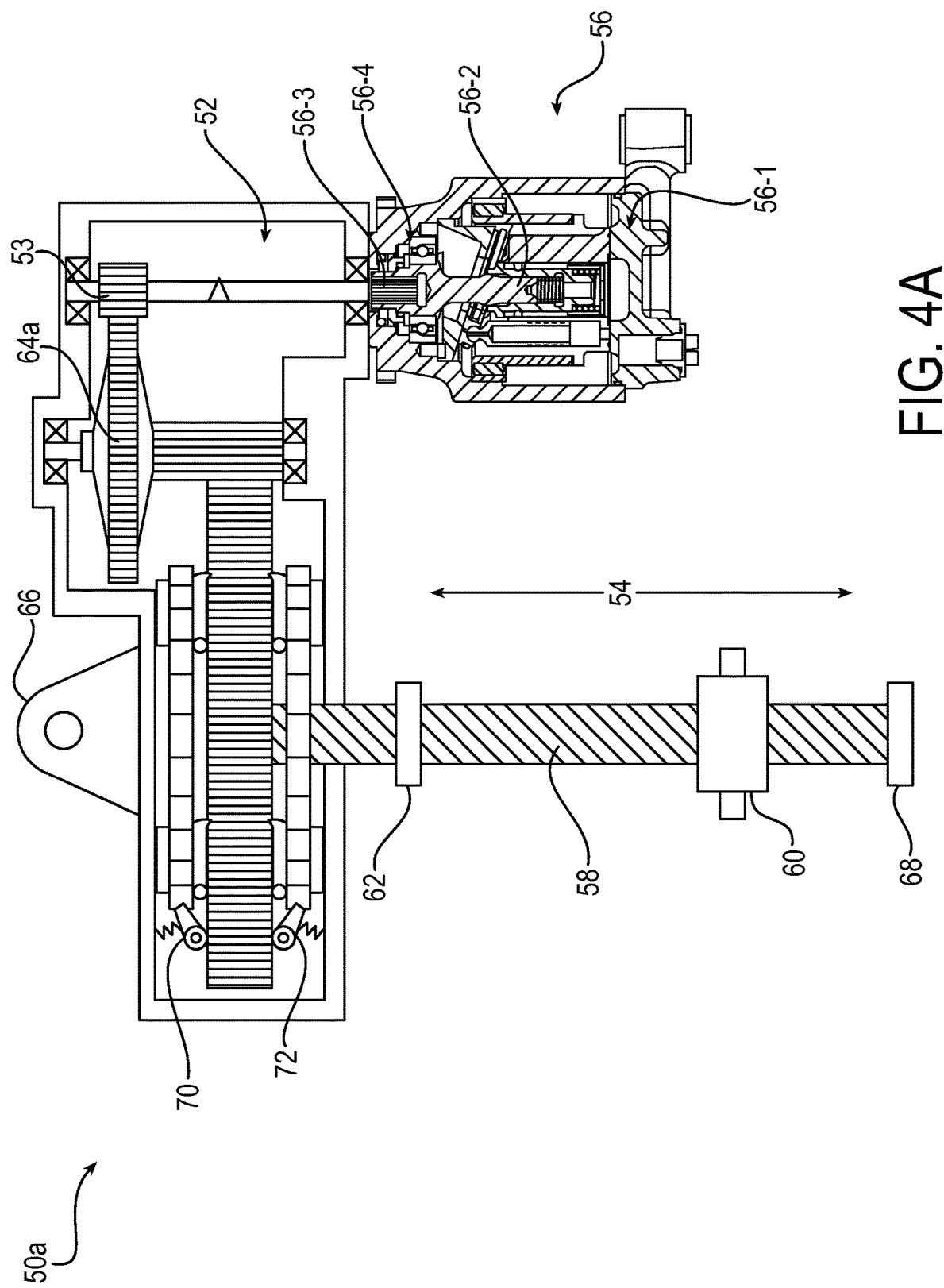
FIG. 4A is a schematic drawing showing a first exemplary embodiment of an actuator for use in the actuation system of any of FIGS. 2A-3B.
Figure 4B:
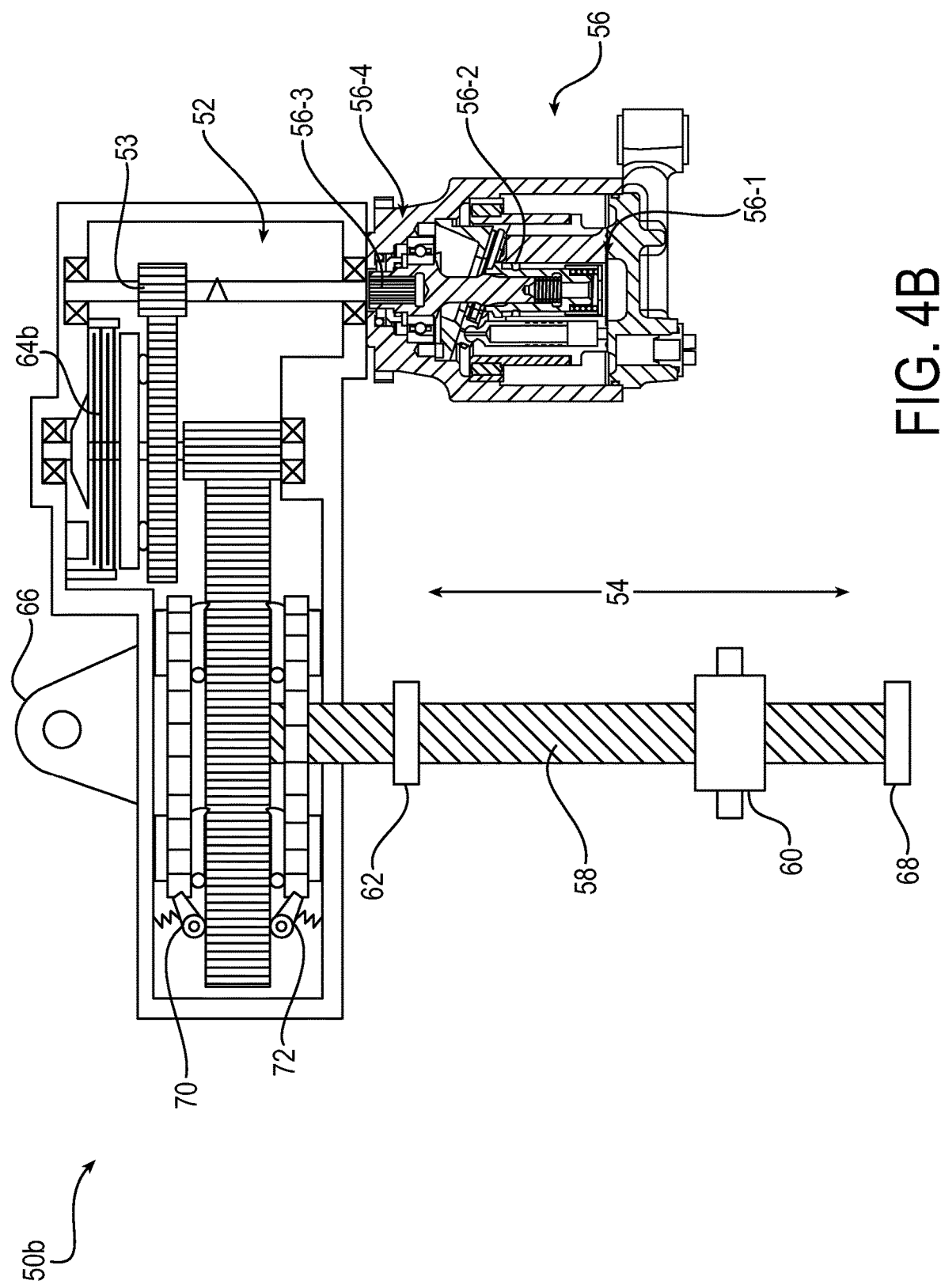
FIG. 4B is a schematic drawing showing a second exemplary embodiment of an actuator for use in the actuation system of any of FIGS. 2A-3B.
Figure 4C:
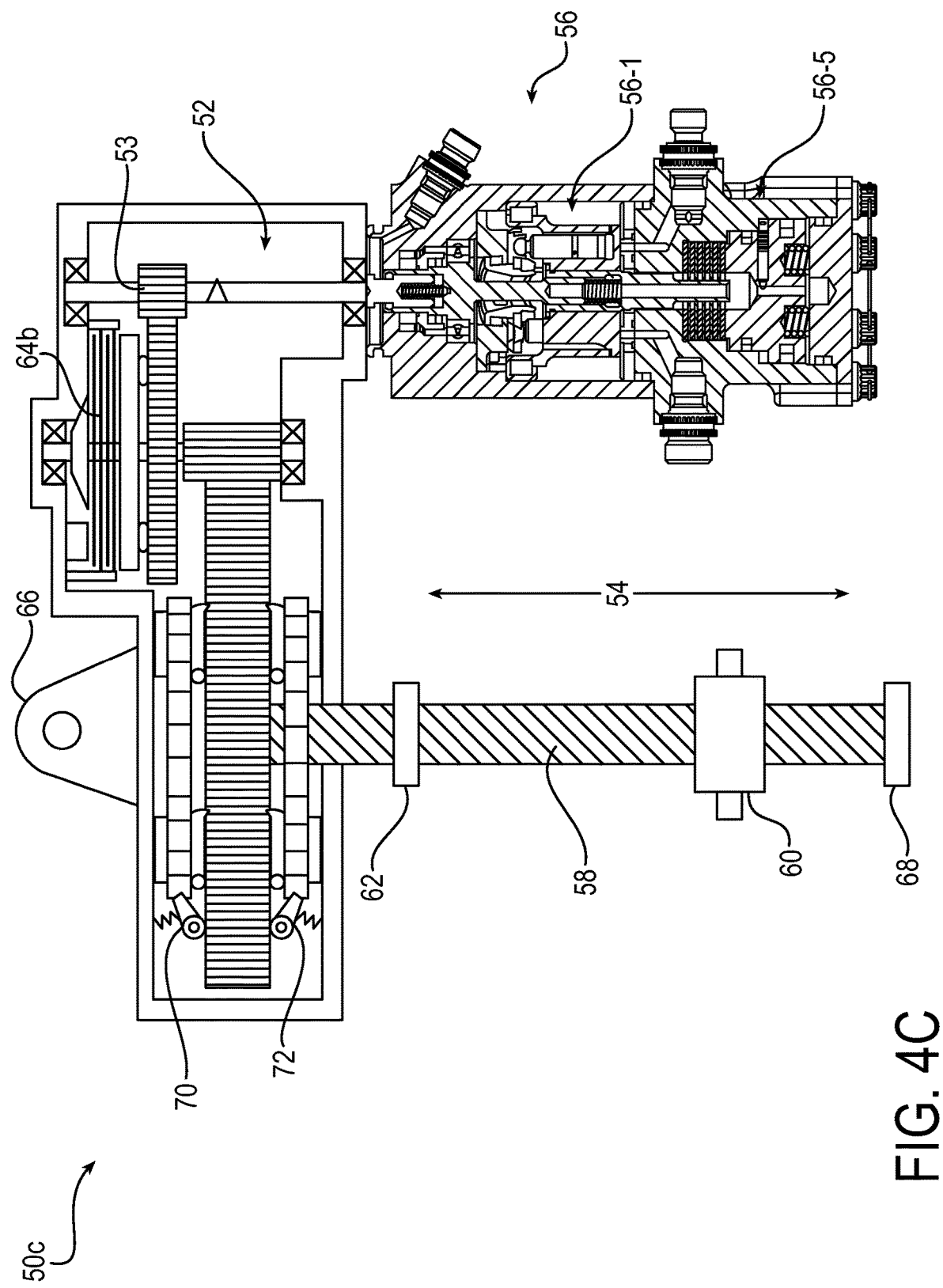
FIG. 4C is a schematic drawing showing a third exemplary embodiment of an actuator for use in the actuation system of any of FIGS. 2A-3B.

Aspects of this application are directed to any number or type of actuator assemblies 36, 38 that may be used in the aircraft 10. For example, the actuators may be rotary actuators or linear actuators. Exemplary actuators 50a, 50b, 50c for use in accordance with aspects of the present invention are illustrated in FIGS. 4A-4C. For purposes of simplicity, a single hydro-mechanical actuator assembly is illustrated.

Referring to FIGS. 4A-4C, the hydro-mechanical actuator assembly 50a, 50b, 50c may be variously disposed. The hydro-mechanical actuator assembly 50a, 50b, 50c may be mounted between a flap and the wing of the aircraft. The hydro-mechanical actuator assembly may be mounted to other adjustable components (e.g., elevators 12, rudder 14, ailerons 16, slats 20, and/or spoilers 22) and structures (e.g., body of aircraft 10, wing 51, tail, etc.). Each actuator assembly 50a, 50b, 50c may include a motion control assembly 52 comprising a drive path 54 from the motion control assembly 52 through the gears 53 to the component (e.g., flap 18), which facilitates controlled movement of the adjustable component. The motion control assembly 52 may include a motion provider 56. The motion provider 56 may be a hydraulic motor 56-1 that is supplied with hydraulic fluid via the hydraulic control module for driving an axial piston 56-2. The axial piston 56-2 may be connected to a drive shaft 56-3 via an associated gearing assembly 56-4 for driving the drive shaft 56-3. Any suitable gearing assembly may be used and the gearing assembly 56-4 may include any suitable gears, such as pinion gears.

The motion control assembly 52 may further include a screw member 58 and a nut member 60. The motion control assembly 52 may also include a suitable load or torque limiting device. As shown in FIG. 4A, the load limiting device may be a slip clutch 64a that limits the load by slipping, or an uncoupling means may be provided that uncouples the load, such that overloads of the motion control assembly 52 are prevented. As shown in FIGS. 4B and 4C, the load limiting device may be a locking torque or load brake 64b, i.e. a torque or load activated overload brake. As further shown in FIG. 4C, the motion provider 56 may further include a hydraulic brake 56-5. Other load limiting devices may be used.

The screw member 58 may be rotated by the motion control assembly 52 and rotation of the screw member 58 may result in linear movement of the nut member 60. Alternatively, (with appropriate modifications), the nut member 60 may be rotated and the screw member 58 moved linearly in response thereto. In either or any event, the members 58/60 may incorporate low friction elements (e.g., balls or rollers) therebetween (e.g., the screw member 58 can be an Acme screw, ball screw, or a roller screw, for example). Members 58/60 may also be sliding contact screws (e.g., buttress, square, etc.), or the actuator output may be a rotating shaft that swings an arm through an arc, for example. The motion control assembly 52 may be pivotally connected to the flight control surface or to a self-aligning member that may be pivotally connected to the flight control surface. In this manner, the screw member 58 may be fixed from axial or translation movement relative to the structure. The nut member 60 may be pivotally connected, via a housing (not shown), to the self-aligning member that is pivotally connected to the adjustable flight control surface (e.g., flap 18).

The motion control assembly 52 thus includes a drive path from the motion provider 56 to the adjustable component (e.g., flap 18), with particular reference to the flaps illustrated in FIGS. 1-3B. The hydraulic motor's rotation of the screw member 58 in one direction will pivot its leading edge upward, and the motor's rotation of the screw member 58 in the opposite direction will pivot its leading edge downward. The assembly 52 may also and/or the motion provider 56 may incorporate "no back" features 70, 72 to eliminate back-driving by aerodynamic forces, in compression 70 and/or in tension 72. A skewed roller and ratchet plate type device is shown, however, other methods to provide irreversibility of the actuator may be used in accordance with aspects of the present invention. Such irreversibility may include but is not limited to Acme Screw, Worm Gears, irreversible gearing, hydraulic valves, and other such devices. Someone practiced in the art may apply this control concept to systems where the motors operate under aiding (regenerating) loads.

The motion provider 56 may not include rotational members such as screw member 58 and the nut member 60. The rotary to linear transducer (screw 58 and nut 60) may be a rolling or sliding contact screw, a rotating shaft, or an arm that swings through an arc. Thus, transferring movement to the component (e.g., flap 18). However, relatively rotational members, and especially those incorporating balls or rollers, often offer higher stiffness, lighter weight, lower cost, and/or greater packaging flexibility. During normal actuator operation, the assembly 52 will control movement of the component (e.g., flap 18) through the drive path.

The actuator assembly 50 may also include a retract stop 62. The retract stop 62 may be coupled to the screw member 58 in such a manner that the retract stop maintains stationary with respect to the screw member. This provides a mechanism for re-synchronizing a group of actuators periodically (e.g., after every retract cycle) by driving into calibrated retract stop 62 at a controlled speed and torque capability, for example.

Referring back to FIGS. 2A and 2B, the actuation system 30 is illustrated with respect to controlling the flaps 18 (e.g., inboard and outboard flaps of the aircraft 10). As illustrated in FIGS. 2A and 2B, four discrete flaps 18a, 18b, 18c, 18d are shown. Each flap may include redundant actuators (e.g., 36) and redundant position sensors 40. As may be appreciated, the position sensors 40 are configured to sense the position of the component, and supply a position signal representative thereof to the actuator controller. The position sensor 40 may be implemented using any one of numerous suitable position sensing devices including, for example, rotary variable differential transformers (RVDTs), linear variable differential transformers (LVDTs), potentiometers, various resistive sensors, and optical sensors, just to name a few. In the depicted embodiment, however, the position sensor 40 is implemented using an LVDT.

The actuators 36 generally are responsible for actuating movement of the adjustable component (e.g., flaps 18) with respect to a stationary portion of the aircraft 10 (e.g. wing 51). Each actuator 36 has a first end 66 coupled to a structure (e.g., body of aircraft 10, wing 51, etc.) and a second end 68 coupled to the component (e.g., flaps 18). The output of the actuators is maintained near synchronous over the applied load range within the volumetric difference between the motors over the operating range between the no-load and the operating point.

Figure 5A:
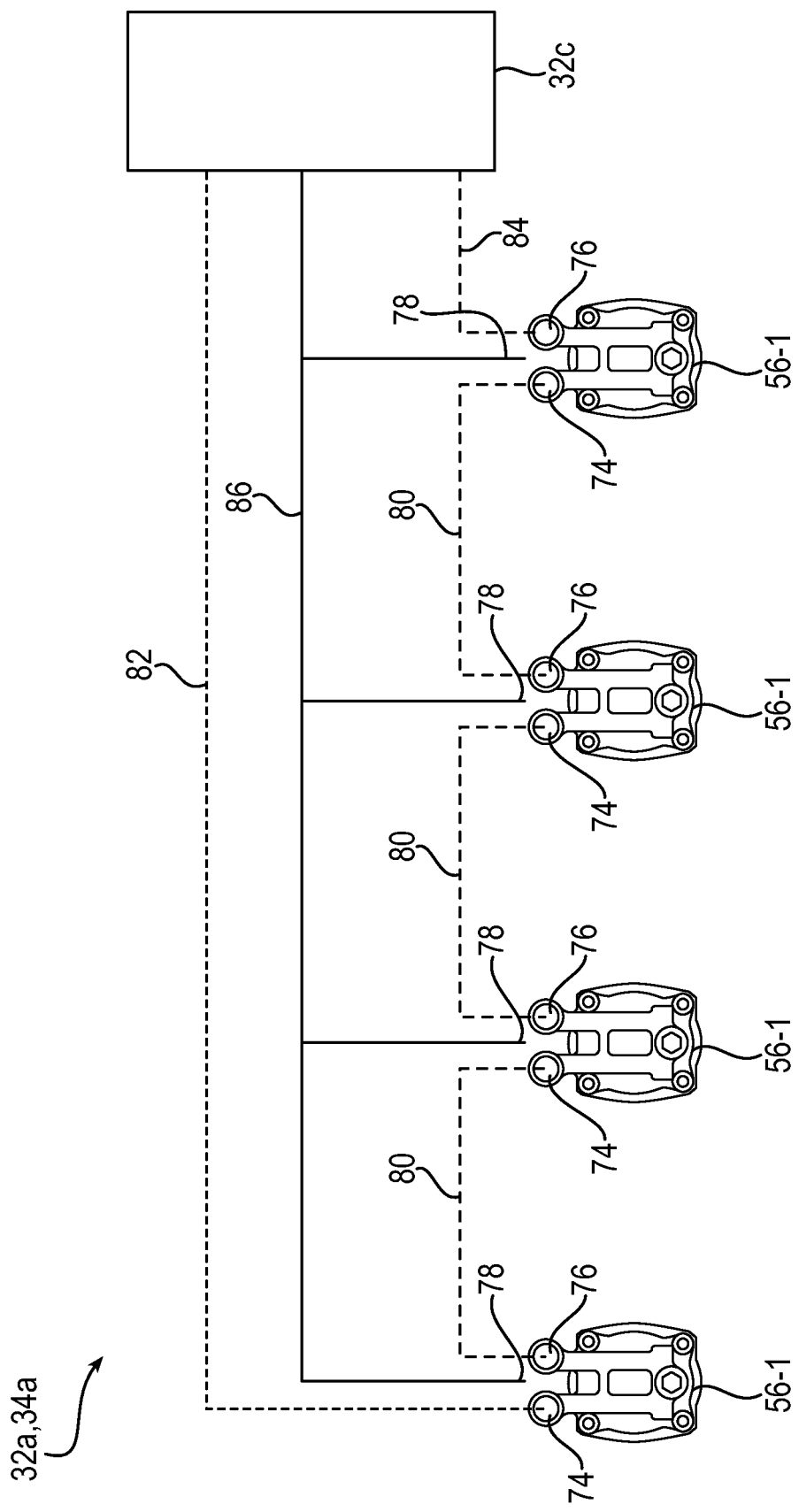
FIG. 5A is a schematic drawing showing a first exemplary embodiment of a hydraulic control module for actuating a plurality of actuators.

Referring now to FIGS. 5A-F, exemplary configurations of the hydraulic control modules 32a, 34a are shown. FIG. 5A is a schematic drawings showing synchronous operation of the hydraulic motors 56-1 within a tolerance of volumetric efficiency. Each motor 56-1 may include a retracting port 74, an extending port 76, and a case drain port 78. The retracting port 74 of at least some of the motors 56-1 may be in fluid communication with an extending port 76 of another motor 56-1 via a hydraulic line 80. At least one of the motors 56-1 may include a retracting port 74 that is not in fluid communication with an extending port 76 of another motor 56-1 and may be in fluid communication with a fluid source 32c of the hydraulic control module 32a, 34a via a hydraulic line 82. At least one of the motors 56-1 may include an extending port 76 or a fluid supply side of the motor 56-1 that is not in fluid communication with a retracting port 74 of another motor 56-1 and may be in fluid communication with the fluid source of the hydraulic control module 32a, 34a via a hydraulic line 84. Each drain port 78 may be in fluid communication with the fluid source 32c of the hydraulic control module 32a, 34a via a hydraulic line 86. The configuration of the hydraulic system may enable the flow through each hydraulic motor 56-1 to be the same. The gear ratio in each motion provider may also be adjusted to vary the leakage through each motor, such that the internal leakage of each motor is well-defined.

Figure 5B:
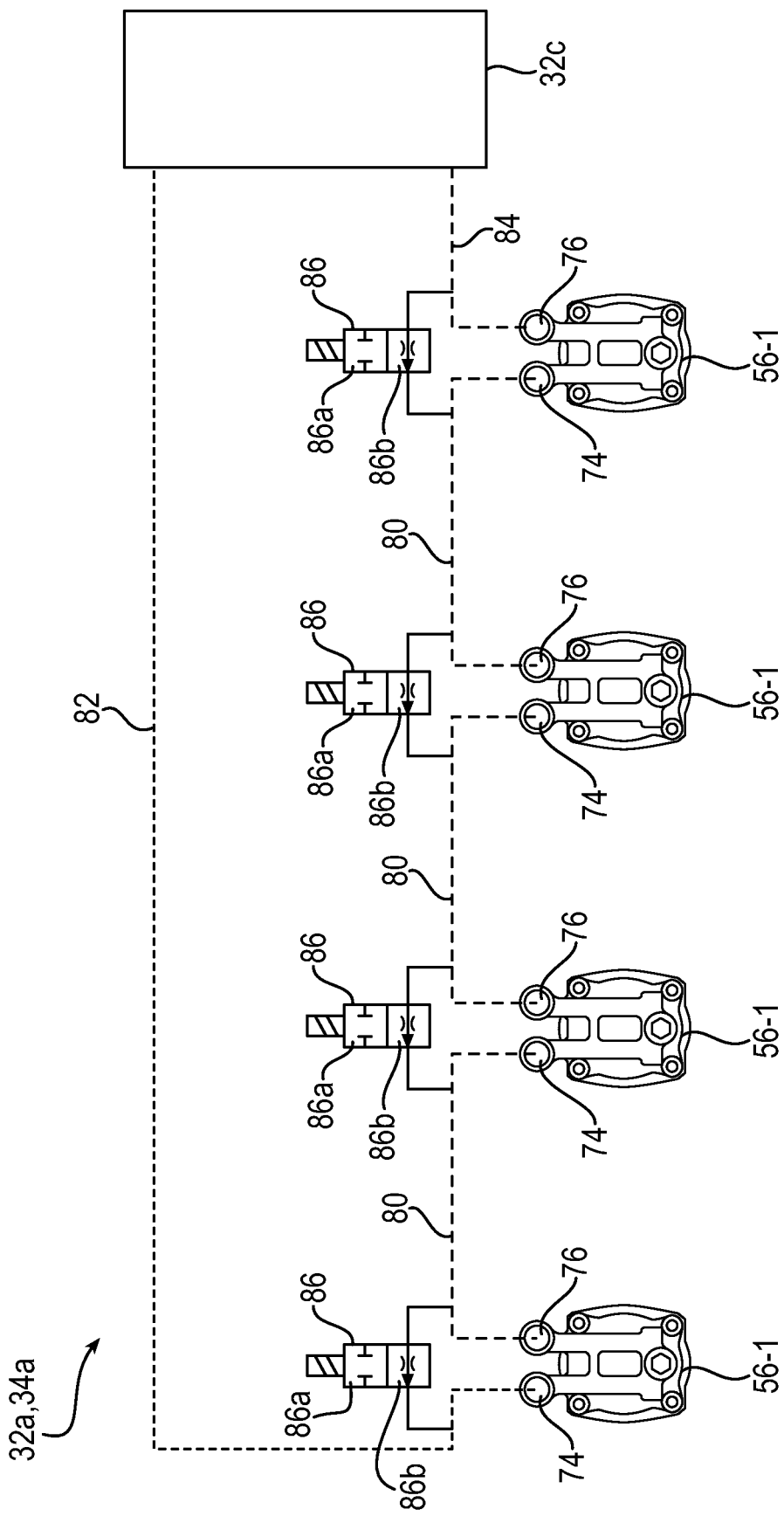
FIG. 5B is a schematic drawing showing a second exemplary embodiment of a hydraulic control module for actuating a plurality of actuators.
Figure 5C:
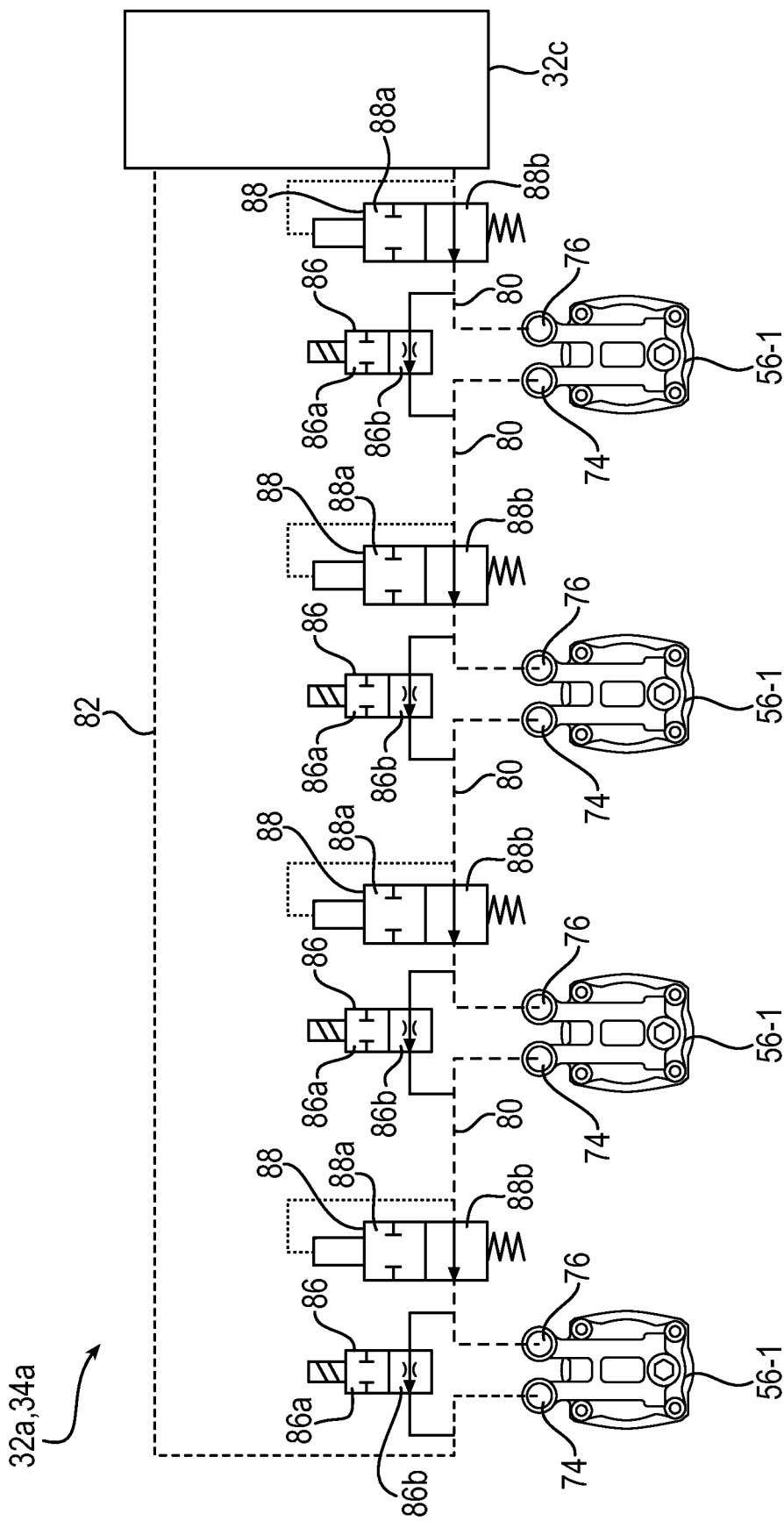
FIG. 5C is a schematic drawing showing a third exemplary embodiment of a hydraulic control module for actuating a plurality of actuators.
Figure 5D:
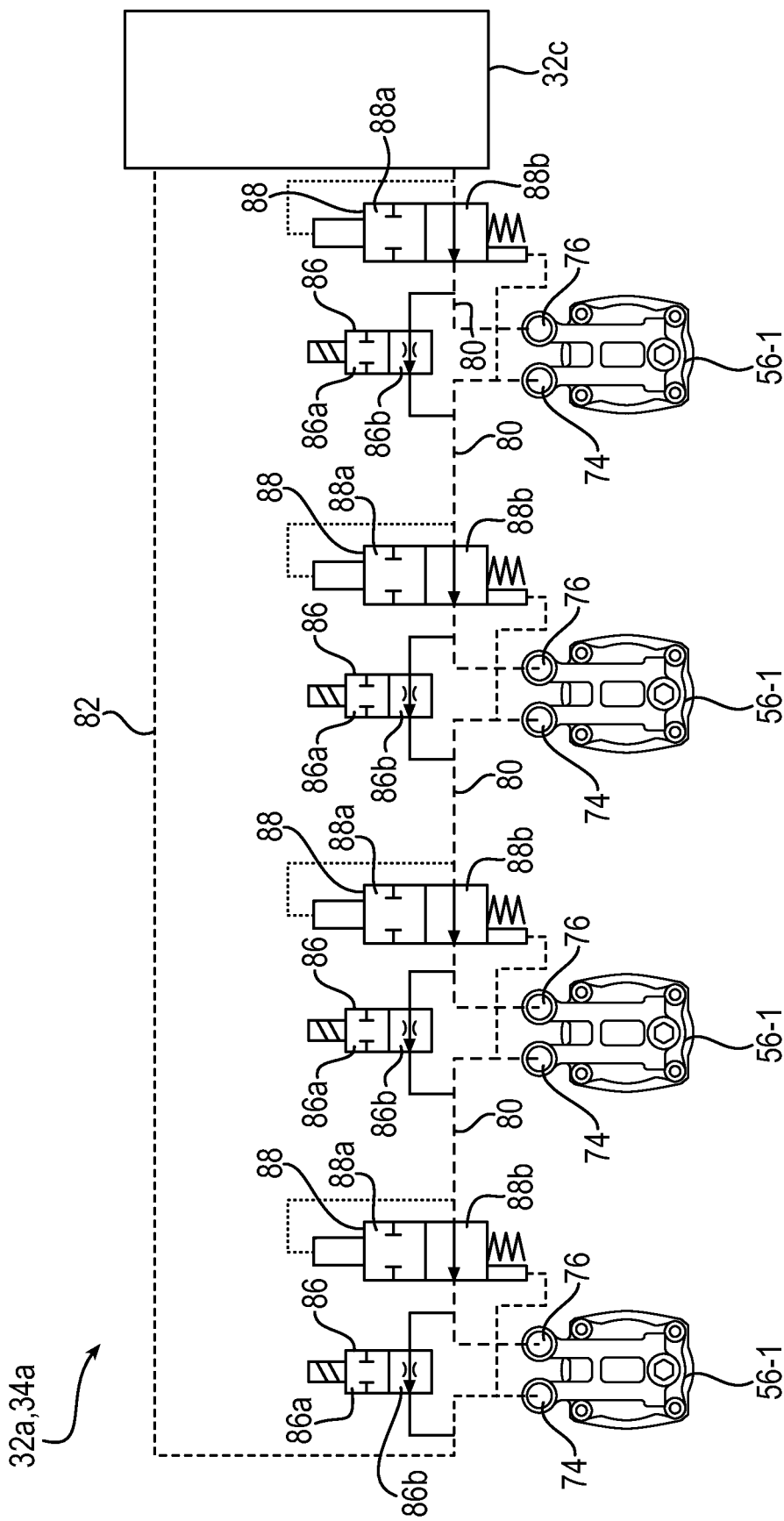
FIG. 5D is a schematic drawing showing a fourth exemplary embodiment of a hydraulic control module for actuating a plurality of actuators.

Referring in addition to FIG. 5B, each hydraulic motor 56-1 may include a directional control valve, such as a by-pass valve 86 connected between the hydraulic lines 80 of the retracting ports 74 and the extending ports 76. The by-pass valve 86 may be any suitable type of valve, such as a fine adjust solenoid valve. During operation, the by-pass valve 86 may be moveable between a closed position 86a or an open position 86b that enables fluid flow through the valve 86. The by-pass valve 86 may be normally in the closed position 86a such that fluid is supplied to the extending port 76 of the corresponding motor 56-1. When the by-pass valve 86 is in the open position 86b, as shown in FIG. 5B, fluid flowing from the retracting port 74 of one of the motors 56-1 may by-pass the extending port 76 of an adjacent motor 56-1 and flow to the hydraulic line 80 of the retracting port 74 of the adjacent motor 56-1. The by-pass valve 86 may be briefly opened for any leading actuator. Using the by-pass valve 86 may enable the lead actuator to slow down and allow the remaining actuators to catch up such that the group of actuators are synchronized. Any suitable number of by-pass valves may be used.

Figure 5E:
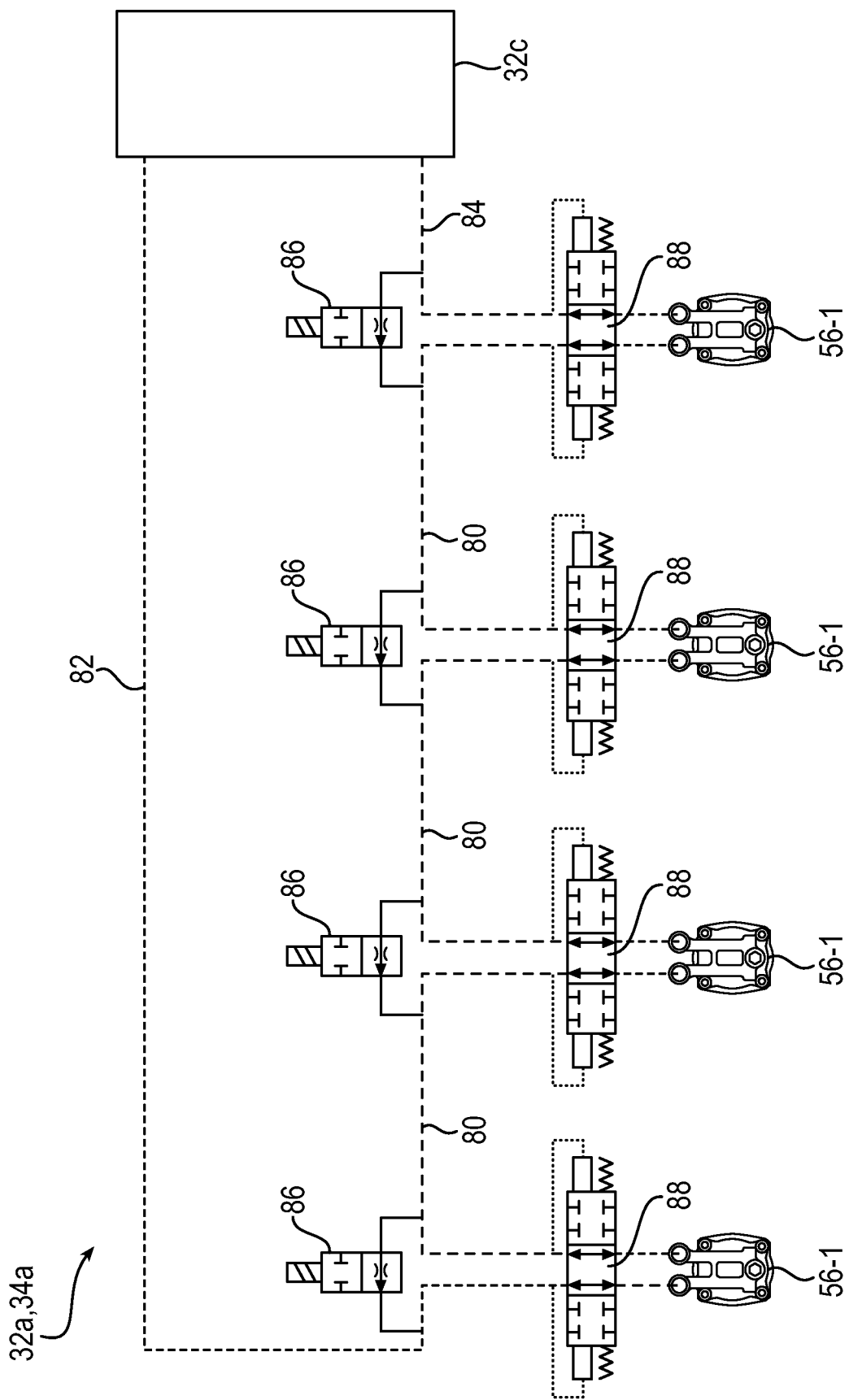
FIG. 5E is a schematic drawing showing a fifth exemplary embodiment of a hydraulic control module for actuating a plurality of actuators.

Referring in addition to FIGS. 5C-F, the actuation system 30 may include a pilot-operated load limiting valve 88, or shut-off valve, for each actuator, in addition to the directional control valve. The pilot-operated load limiting valves 88 may be arranged along the hydraulic fluid lines 80 and may block flow to one of the actuators when supply pressure exceeds a predetermined value. Each load limiting valve 88 may be moveable between a closed position 88a and an open position 88b. During operation of the actuators, when pressure in the supply side or the extending port 76 of a corresponding actuator rises to a predetermined level, the pilot chamber of the load limiting valve 88 may drive the valve 88 towards the closed position 88a, such that fluid flow through the hydraulic line 80 to the extending port 76 is blocked. The load limiting valves 88 may be used to prevent overload of the actuators and any suitable number of load limiting valves 88 may be used. Each load limiting valve 88 may have a predetermined setting that is unique for each valve 88. As further shown in FIG. 5D, the load limiting valves 88 may be configured such that during an actuator overload, the delta pressure across the motor 56-1 may increase and causes the pilot chamber of the valve 88 to drive the valve 88 towards the closed position 88a. As shown in FIG. 5E, the load-limiting valves 88 may be configured as bi-directional valves to accommodate for overloading on either side of the motor 56-1.

Figure 5F:
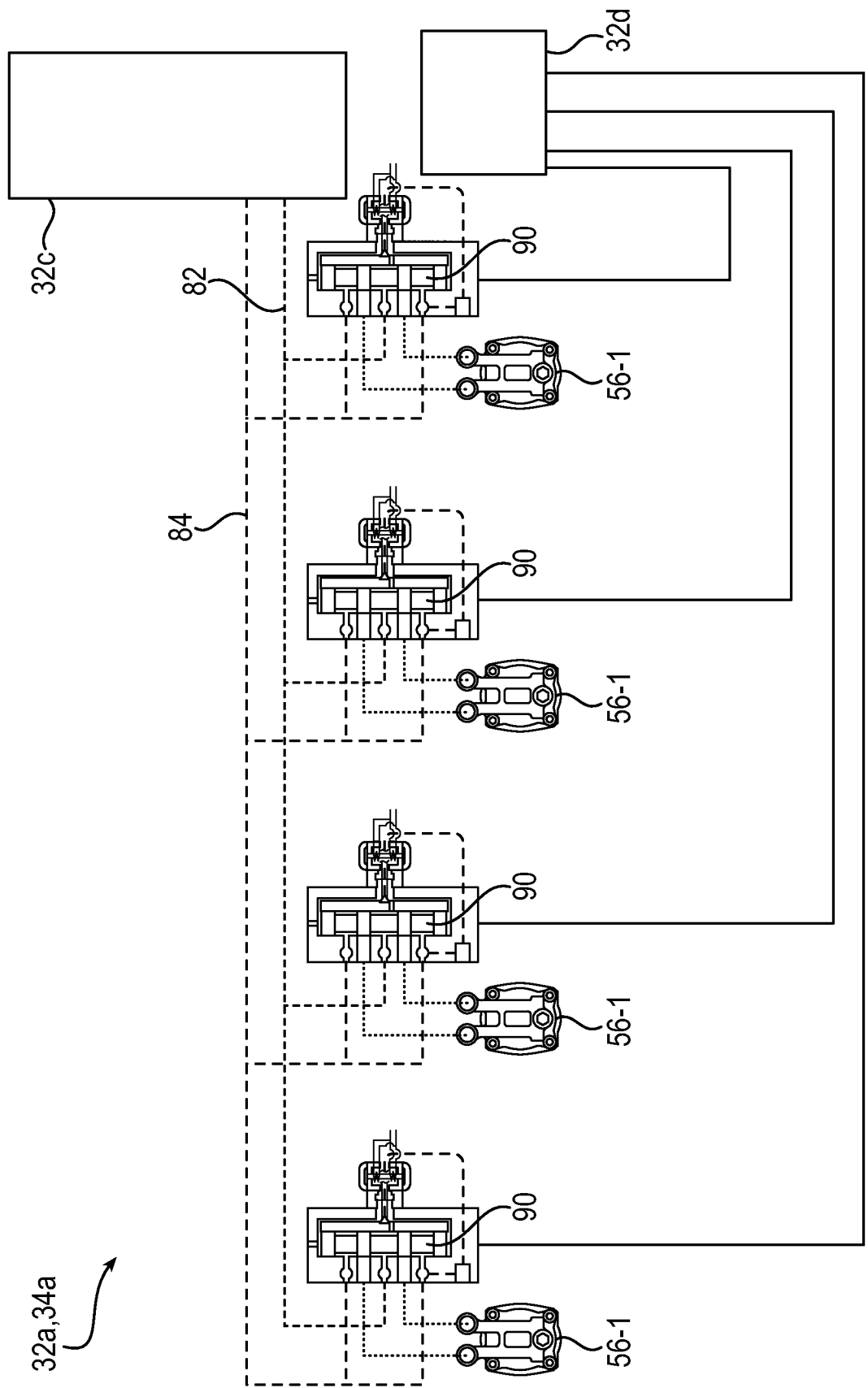
FIG. 5F is a schematic drawing showing a sixth exemplary embodiment of a hydraulic control module for actuating a plurality of actuators.

As shown in FIG. 5F, in lieu of directional valves 86 and load limiting valves 88, the hydraulic control module 32a, 34a may include a plurality of electro-hydraulic servo valves 90 that are associated with the actuators for providing open loop or servo control of the actuation system 30, such that the hydraulic flow rate is controlled to assure that the motors operate at a predetermined speed. The hydraulic control module 32a, 34a may include central control electronics 32d and each electro-hydraulic servo valve 90 may be in electronic communication with the central control electronics 32d for controlling operation of the valves 90.

Referring now to FIG. 6, a schematic drawing of the operation of the hydraulic control module 32a, 34a is shown. As aforementioned, the hydraulic control module 32a, 34a may include any suitable numbers or types of control valves for controlling the flow of hydraulic fluid to the actuators. FIG. 6 shows the direction of fluid flow through the actuation system. The hydraulic control module 32a, 34a, may include a motor operated valve 92 that may be in fluid communication with a fluid source 94 for supplying hydraulic fluid to the actuation system. The motor operated valve 92 may be in communication with an arming valve 95. When the arming valve 95 is actuated or in the open position allowing fluid to pass therethrough, the hydraulic fluid may flow to the directional control valve, i.e. bypass flow valve 86. The hydraulic control module 32a, 34a may further include a plurality of pressure compensated flow control valves 96a, 96b that each maintain a set pressure differential. The control valves 96a, 96b may include a first control valve 96a that compensates for flow on a left or right side of the corresponding actuator and a second control valve 96b that compensates for flow on the other of the left or right side of the actuator. The hydraulic control module 32a, 34a may include a plurality of directional control valves 86 and each directional control valve 86 may correspond to one of the plurality of actuators. Each directional control valve 86 may also be in communication with both a right side pressure compensated flow control valve 96b and a left side pressure compensated flow control valve 96a.

Figure 7:
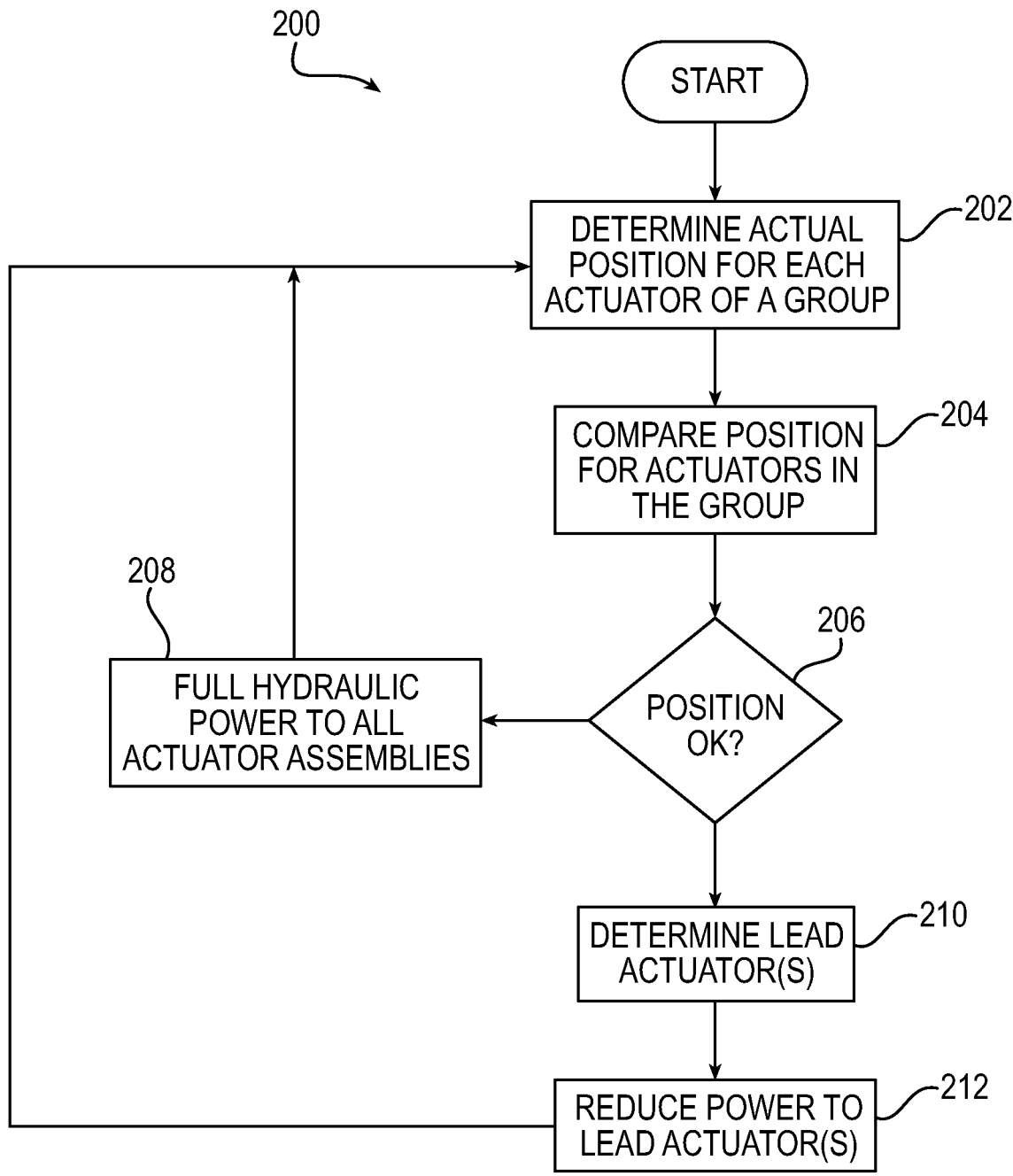
FIG. 7 is a block diagram illustrating an exemplary method for controlling a plurality of actuators.

Referring now to FIG. 7, illustrated is a flow chart 200 describing the steps of an exemplary method of synchronizing different motors and/or actuator assemblies 36, 38 powered by a hydraulic control module and assigned to a common group (e.g., the same or related flight surfaces) in accordance with the present invention. Beginning at block 202, the position of each actuator assembly 36, 38 of the group is determined, for example, using position sensors 40. More particularly, data from each position sensor 40 of a group is used to determine a position for the actuator assembly corresponding to that sensor 40. For example, in the case where the position sensor 40 is an LVDT, the voltage output by the LVDT is proportional to position of the actuator assembly along its range of motion. Thus, based on the voltage output by the LVDT the position of the actuator assembly along its range of motion can be determined.

Next at block 204, the position data obtained at block 202 for each actuator assembly of the group is compared to one another. Such comparison may be by way of simply comparing the voltage provided by each LVDT 40, for example.

At block 206 it is determined if position correction is required. In this regard, if the position of each actuator assembly 36, 38 in the group is within a prescribed tolerance of the other actuator assemblies 36, 38 of the group (e.g., within 2 percent), then no correction is required and the method moves to block 208 where full hydraulic power is provided to all the actuator assemblies of the group. The method then moves back to block 202 and repeats.

Moving back to block 206, if the position of one or more actuator assemblies 36, 38 is not within a prescribed tolerance of the position of other actuator assemblies 36, 38 of the group, then the method moves to block 210 where it is determined which of the actuator assemblies 36, 38 positionally leads the other actuator assemblies. In this regard, the position data provided by the position sensor 40 can be used to determine which of the actuator assemblies positionally leads the other actuator assemblies.

For example, if 0 volts represents a fully retracted position of the flight surface and 10 volts represents a fully extended position of the flight surface, then as the actuator assembly 36, 38 moves the flight surface toward the fully extended position the voltage provided by the position sensor 40 will increase. The voltage from each position sensor 40 of the group then can be compared to determine which sensor 40 is indicating the highest voltage. The actuator assembly 36, 38 associated with the sensor providing the highest voltage then can be said to be the leading actuator. Conversely, if the actuator assembly 36, 38 moves the flight surface toward the fully retracted position the voltage provided by the position sensor will decrease. The actuator assembly associated the sensor providing the lowest voltage then can be said to be the leading actuator assembly.

Upon identifying the lead actuator assembly, the method moves to block 212 where the power provided to a motion provider of the lead actuator assembly is reduced. In this regard, the hydraulic control module may be commanded to reduce the power provided to the motion provider of the lead actuator assembly. Such power reduction causes the motion provider for the lead actuator assembly 36, 38 to slow down, thereby allowing the other actuator assemblies to positionally catch up to the lead actuator assembly. The method then moves back to block 202 and repeats.

In determining which actuator assembly 36, 38 positionally leads the other actuator assemblies, it is possible that more than one actuator assembly 36, 38 is found to positionally lead the other actuators. In such event, one actuator assembly (a first actuator assembly) may have a greater lead than the other actuator assembly (a second actuator assembly), and therefore, the first actuator assembly 36, 38 may be identified as the lead actuator assembly. Therefore, the method may reduce power only to the motion provider of the first actuator assembly 36, 38 while retaining full power to the motion providers of other actuator assemblies (including the second actuator assembly). Eventually, however, the position error for the first actuator assembly will be reduced to the point where it no longer leads the second actuator assembly. At this time, the method will automatically restore power to the motion provider of the first actuator assembly and reduce power to the motion provider of the second actuator assembly. In this manner, the two leading actuator assemblies will be alternately stepped back in line with the position of the other actuator assemblies.

It is possible that two or more actuator assemblies 36, 38 positionally lead one or more other actuator assemblies by the same distance. In this instance, power to the motion providers for the two or more actuator assemblies may be reduced such that both actuator assemblies slow down relative to the one or more lagging actuator assemblies.

Figure 8:
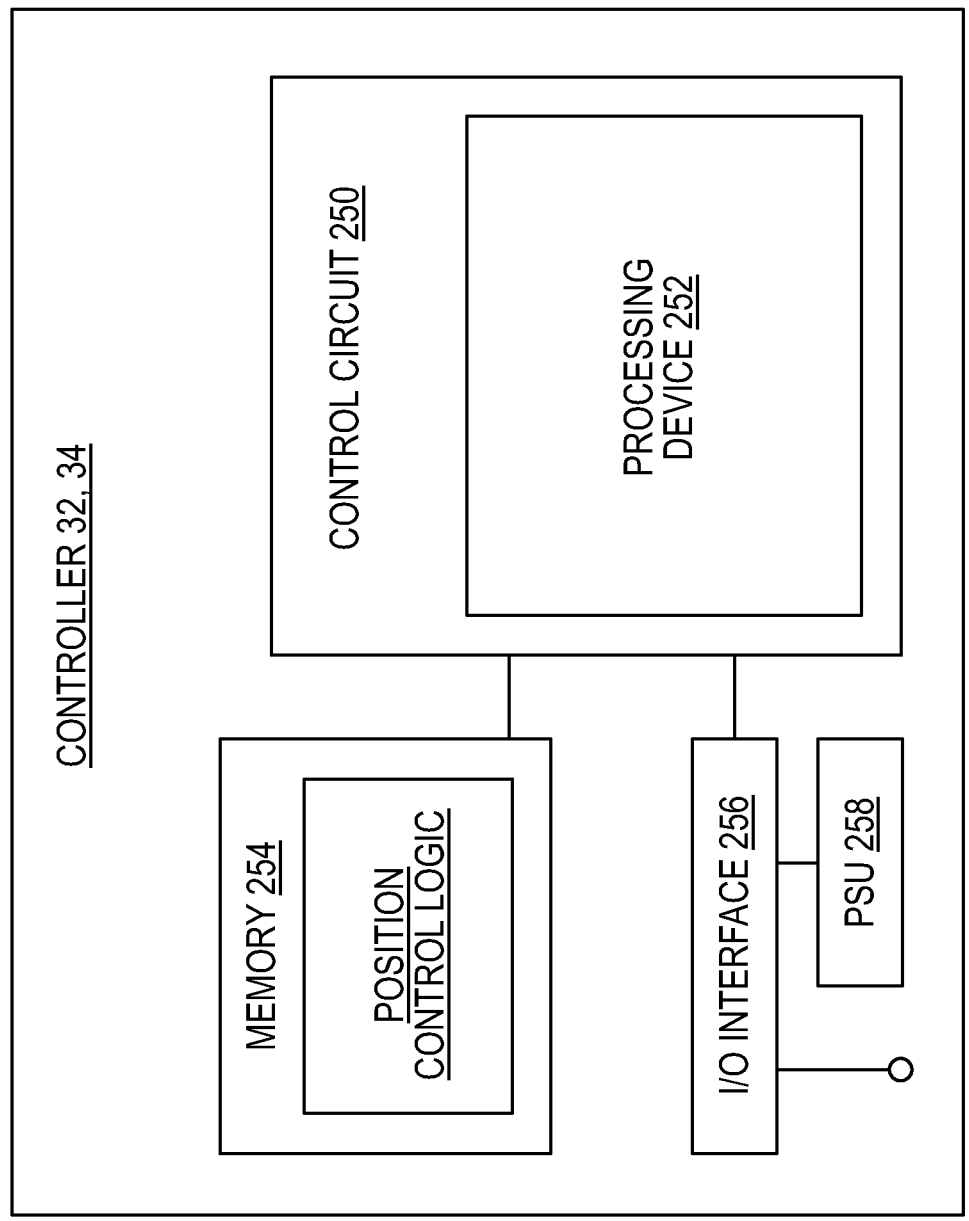
FIG. 8 is a schematic drawing showing an exemplary controller for executing the method of FIG. 7.

Referring now to FIG. 8, schematically shown is an exemplary controller 32, 34 (as also shown in FIGS. 2A and 2B) that may be used to execute the method of FIG. 7. The controller or controllers 32, 34 may be in communication with the hydraulic control modules for controlling the actuation system. The controller 32, 34 includes a control circuit 250 that is responsible for overall operation of the controller 32, 34. For this purpose, the control circuit 250 includes a processor 252 that executes various applications, such as a position control function that carries out tasks that enable fine position control of the actuator assemblies as described herein. The position control function may be implemented in the form of logical instructions that are executed by the processor.

The processor 252 of the control circuit 250 may be a central processing unit (CPU), microcontroller or microprocessor. The processor 252 executes code stored in a memory (not shown) within the control circuit 250 and/or in a separate memory, such as a memory 254. The memory 254 may be, for example, one or more of a buffer, a flash memory, a hard drive, a removable media, a volatile memory, a non-volatile memory, a random access memory (RAM), or other suitable device. In a typical arrangement, the memory 254 includes a non-volatile memory for long term data storage and a volatile memory that functions as system memory for the control circuit 250. The memory 254 may exchange data with the control circuit 250 over a data bus. Accompanying control lines and an address bus between the memory 254 and the control circuit 250 also may be present. The memory 254 is considered a non-transitory computer readable medium.

The controller 132, 134 may further include one or more input/output (I/O) interface(s) 256. The I/O interface(s) 256 may be in the form of typical I/O interfaces and may include one or more electrical connectors for operatively connecting the controller 32, 34 to another device (e.g., a computer) via a cable and/or to received and output signals (e.g., digital or analog I/O). Further, operating power may be received over the I/O interface(s) 256 and power to charge a battery of a power supply unit (PSU) 258 within the controller 32, 34 may be received over the I/O interface(s) 256. The PSU 258 may supply power to operate the controller 32, 34 in the absence of an external power source.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A control system comprising:
a plurality of actuators for actuating movement of one or more adjustable components of an aircraft, wherein each actuator has a first end couplable to a structure of the aircraft and a second end couplable to one of the one or more adjustable components, each actuator including a motion control assembly having a hydraulic motor and a drive path from the hydraulic motor to the one or more adjustable components, each hydraulic motor having an extend port and a retract port wherein the one or more adjustable components are configured to move along a respective drive path;

a single hydraulic control module fluidly connected to the extend port and the retract port of each hydraulic motor, wherein each hydraulic motor in the plurality of actuators is fluidly connected in series whereby the single hydraulic control module controls all of the plurality of actuators; and a controller operable to output hydraulic power from the single hydraulic control module to each motion control assembly to actuate movement of the one or more adjustable components.

2. The control system of claim 1, wherein the controller is configured to identify an actuator of the plurality of actuators that positionally leads other actuators of the plurality of actuators, and reduce hydraulic power to the motion control assembly assigned to the actuator that positionally leads the other actuators.

3. The control system of claim 1, wherein the hydraulic control module includes at least one directional control valve that reduces or bypasses hydraulic power to at least one actuator of the plurality of actuators.

4. The control system of claim 3, wherein the at least one directional control valve is in fluid communication between the extend port of a first actuator and the retract port of a second actuator.

5. The control system of claim 3, wherein the at least one directional control valve includes a plurality of directional control valves, wherein each of the plurality of directional control valves corresponds to one of the plurality of actuators.

6. The control system of claim 3, wherein the at least one directional control valve is a fine control solenoid valve.

7. The control system of claim 3, wherein the hydraulic control module includes at least one pilot operated load limiting valve for blocking flow to one of the plurality of actuators when supply pressure exceeds a predetermined value.

8. The control system of claim 7, wherein the at least one pilot operated load limiting valve is a bi-directional valve.

9. The control system of claim 1, wherein the hydraulic control module includes at least one electro-hydraulic servo valve.

10. The control system of claim 1, wherein the hydraulic motor includes a hydraulically operated brake.

11. The control system of claim 1, wherein each of the plurality of actuators includes an acme, ball, or roller screw type linear actuator.

12. The control system of claim 1, wherein each of the plurality of actuators includes a gear-driven rotary actuator.

13. The control system of claim 1, wherein at least one of the plurality of actuators includes a mechanical overload protection device, the mechanical overload protection device being a slip clutch, a torque activated overload brake, or a load activated overload brake.

14. The control system of claim 1, wherein at least one of the plurality of actuators includes a no-back mechanism for preventing an applied load from backdriving the at least one of the plurality of actuators.

15. The control system according to claim 1, wherein the controller includes a first controller that outputs controlled hydraulic drive power to a first set of actuators for actuating movement of a first set of components and a second controller that outputs controlled hydraulic drive power to a second set of actuators for actuating movement of a second set of components.

16. The control system according to claim 15, wherein the first set of components and the second set of components includes at least one of a flap, a slat, a spoiler, an aileron, and an elevator.

17. The control system according to claim 15, wherein the first set of components includes a left outboard flap and a right outboard flap, and the second set of components includes a left inboard flap and a right inboard flap.

18. A control system comprising:

a plurality of actuators for actuating movement of one or more adjustable components of an aircraft, wherein each actuator has a first end couplable to a structure of the aircraft and a second end couplable to one of the one or more adjustable components, each actuator including a motion control assembly having a hydraulic motor and a drive path from the hydraulic motor to the one or more adjustable components, each hydraulic motor having an extend port and a retract port wherein the one or more adjustable components are configured to move along a respective drive path;

a hydraulic control module fluidly connected to the extend port and the retract port of each hydraulic motor; and a controller operable to output hydraulic power from the hydraulic control module to each motion control assembly to actuate movement of the one or more adjustable components, wherein the controller is configured to identify an actuator of the plurality of actuators that positionally leads other actuators of the plurality of actuators, and reduce hydraulic power to the motion control assembly assigned to the actuator that positionally leads the other actuators.

* * * * *